Dec. 25, 1956  O. M. CRISWELL  2,775,750
MOTOR VEHICLE LIGHT CIRCUIT WARNING DEVICE
Filed Sept. 6, 1955

INVENTOR.
OWEN M. CRISWELL
BY
McMorrow, Berman + Davidson
ATTORNEYS

_United States Patent Office_ 2,775,750
Patented Dec. 25, 1956

2,775,750

MOTOR VEHICLE LIGHT CIRCUIT WARNING DEVICE

Owen M. Criswell, Valparaiso, Ind.

Application September 6, 1955, Serial No. 532,621

1 Claim. (Cl. 340—52)

This invention relates to motor vehicle alarms, and more particularly to an improved warning device for notifying the operator of a motor vehicle that the vehicle light circuit is still energized when the vehicle ignition circuit is turned off, thereby eliminating the possibility of leaving the vehicle headlights energized when the vehicle is parked, or for leaving other light circuits of the vehicle energized when the vehicle motor is not in operation.

A main object of the invention is to provide a novel and improved motor vehicle light warning circuit which is simple in construction, which is easy to install, and which provides a reliable indication of the energization of a vehicle light circuit when the vehicle motor is deenergized, thus eliminating the possibility of inadvertently leaving the vehicle light circuits energized when the vehicle is parked.

A further object of the invention is to provide an improved warning circuit for notifying the operator of a vehicle when the vehicle light circuits are energized with the vehicle motor deenergized, the improved warning circuit involving inexpensive components, being arranged so that it may be readily mounted adjacent or on the instrument panel of a vehicle, and providing a means of greatly reducing the drain on a vehicle battery by reducing the possibility of inadvertently leaving the vehicle light circuits energized when the vehicle is parked.

Further objects and advantages of the invention will become apparent from the following description and claim, and from the accompanying drawings, wherein:

Figure 2:
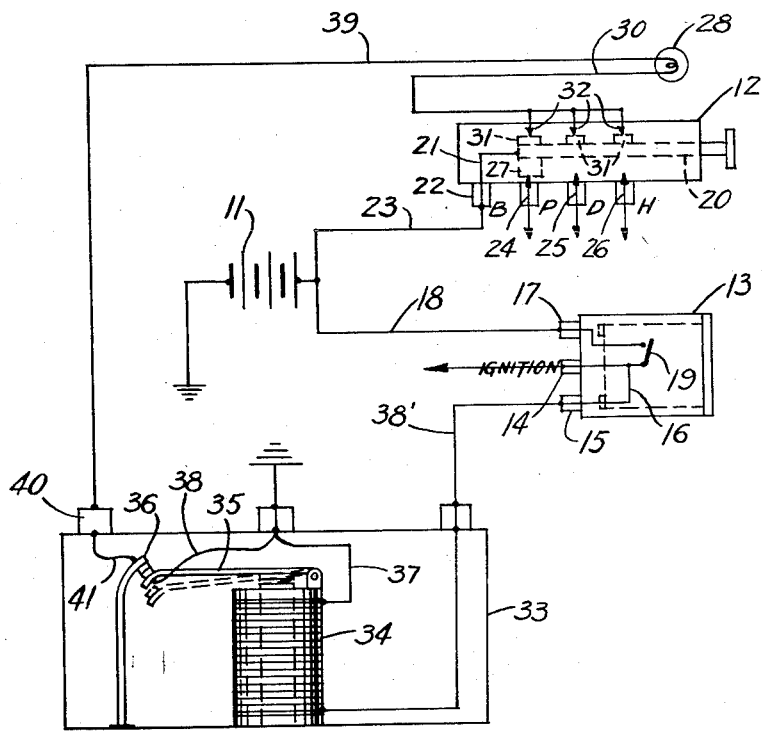
Figure 2 is an electrical circuit diagram showing the connections of the warning system of Figure 1.

Referring to the drawings, 11 designates the vehicle battery and 12 designates the vehicle lighting circuit control switch, as employed in a conventional motor vehicle. Designated at 13 is a vehicle ignition switch, said switch comprising respective terminals 14 and 15 which are connected together, as by a conductor 16, and an additional terminal 17, as shown in Figure 2. The terminal 17 is connected by a conductor 18 to the ungrounded terminal of the vehicle battery 11. The terminal 14 is connected to the vehicle ignition circuit. The movable pole of the switch 13, shown at 19, is arranged to electrically connect terminals 14 and 15 to terminal 17 when the pole is in its closed position. The ignition switch 13 is of the conventional type, for example being operated by a suitable ignition key, which when inserted in the switch and rotated, causes the switch pole 19 to close.

The light circuit control switch 12 is substantially conventional in construction, for example, including a slidable body 20 of conductive material which is electrically connected at one end, as by a flexible conductor 21 to a terminal 22, said terminal 22 being connected by a suitable conductor 23 to the ungrounded terminal of the vehicle battery 11. The switch 12 has suitable spaced contacts 24, 25 and 26 which are engageable selectively by a contact element 27 on the body 20, whereby said body 20 may be longitudinally adjusted to electrically connect any one of the contacts 24, 25 or 26 to the battery wire 23. The terminals 24, 25 and 26 are respectively connected to the parking light circuit of the vehicle, the dim headlight circuit of the vehicle, and the bright headlight circuit of the vehicle, whereby these circuits may be selectively energized by operation of the switch body 20, as above described.

The body 20 may, of course, be moved to a position wherein the contact element 27 thereof does not engage any of the contacts 24, 25 or 26, whereby none of the associated light circuits are energized.

Figure 1:
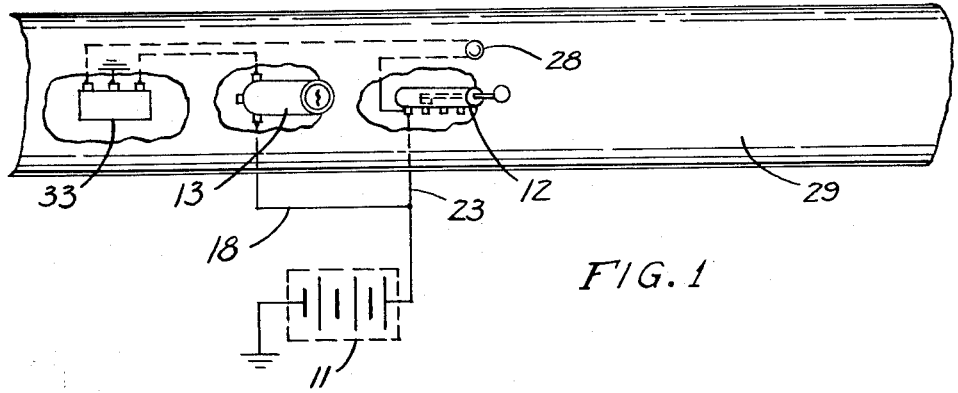
Figure 1 is a fragmentary front elevational view of a portion of the instrument panel of a motor vehicle provided with an improved vehicle light circuit warning system according to this invention.

Designated at 28 is a signal lamp which may be either a lamp of the steady illumination type, or of the flasher type, the lamp 28 being mounted on the vehicle instrument panel, as shown at 29 in Figure 1. Designated at 30 is a terminal wire which is connected to the socket of the lamp 28, said terminal wire 30 being arranged so that it will be connected to the ungrounded terminal of the battery 11 when the light switch body 20 is in any one of its circuit making positions, namely, when the contact element 27 associated with the body 20 engages any one of the contacts 24, 25 or 26. Thus, the body 20 may be provided with additional contact elements 31 spaced similarly as the contact elements 24, 25 and 26, and being engageable with respective stationary contacts 32 provided on the case of the switch 12 whenever the contact member 27 engages any one of the contacts 24, 25 or 26. As shown in Figure 2, the terminal wire 30 is connected to the contact 32.

Designated at 33 is a relay unit which comprises a solenoid 34 having a pivoted armature 35, said armature being biased by suitable spring means into conductive engagement with a stationary contact member 36 mounted in the housing of the relay unit 33. When the solenoid 34 is energized, the armature 35 is retracted and disengages from contact 36.

As shown in Figure 2, one terminal of the solenoid 34 is connected to ground, as by a wire 37. Also connected to ground by a wire 38 is the armature 35. The other terminal of solenoid 34 is connected by a wire 38' to the terminal 15 of the ignition switch 13.

The lamp 28 is provided with a second lead wire 39 which is connected to a terminal 40 of the relay unit 33, said terminal 40 being connected by a wire 41 to the stationary contact 36.

When the pole 19 of the ignition switch 13 is closed, the solenoid 34 will be energized by a circuit which includes battery 11, wire 18, pole 19, wire 16, wire 38', the solenoid winding, wire 37 and ground. Thus the armature 35 will be separated from the contact 36. Therefore the lamp 28 cannot be energized, since wire 39 is disconnected from ground at the open contacts 35 and 36. However, assuming that pole 19 is in open position, as when the operator parks the vehicle and leaves, solenoid 38 will be deenergized, allowing armature 35 to engage the contact 36. Assuming that the light circuit control switch 12 is left with its body element 20 in circuit-energizing position, namely, in a position wherein the contact element 27 of body 20 engages any one of the contacts 24, 25 or 26, an energizing circuit for the warning lamp 28 will be completed, said circuit comprising the battery 11, the wire 23, the wire 21, body 20, one of the contact elements 31, one of the contacts 32, wire 30, lamp 28, wire 39, terminal 40, wire 41, contacts 36 and 35, wire 38, and ground. Thus, the lamp 28 will be illuminated, notifying the operator that he has left one of the vehicle light circuits energized, whereby the operator is reminded to open the light control switch 12 and deenergize the vehicle light circuit.

Should the vehicle motor be running, the ignition switch pole 19 will be closed, which energizes the solenoid 34, opening contacts 35 and 36, thus preventing energization of the warning lamp 28.

Obviously, the lamp 28 may be of the type providing a steady illumination, or alternatively, may be of the flasher type, providing intermittent illumination, so as to render it more conspicuous and to provide a more distinctive warning.

While a specific embodiment of an improved motor vehicle light circuit warning system has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle having an ignition circuit, a vehicle light circuit, and a source of current, a relay having normally closed contacts, said contacts being opened responsive to the energization of said relay, a warning lamp, means connecting said relay in parallel with said ignition circuit, an ignition switch, circuit means connecting said ignition circuit to said source of current through said ignition switch, a vehicle light control switch, circuit means connecting said vehicle light circuit to said source of current through said light control switch, a further switch, means mechanically coupling said further switch to said light control switch and being formed and arranged to close said further switch simultaneously with said light control switch, and circuit means connecting said warning lamp to said source of current through said contacts and said further switch, whereby said warning lamp will be energized when the ignition switch is opened and the light control switch is closed.

References Cited in the file of this patent
UNITED STATES PATENTS

| | | |
|---|---|---|
| 2,349,740 | McCollum | May 23, 1944 |
| 2,507,398 | Castro | May 9, 1950 |
| 2,613,258 | Azano | Oct. 7, 1952 |
| 2,722,673 | Turner | Nov. 1, 1955 |